Sept. 14, 1965 G. W. BLOOMQUIST 3,206,158
SHUT-OFF VALVE
Filed Oct. 23, 1962 2 Sheets-Sheet 1
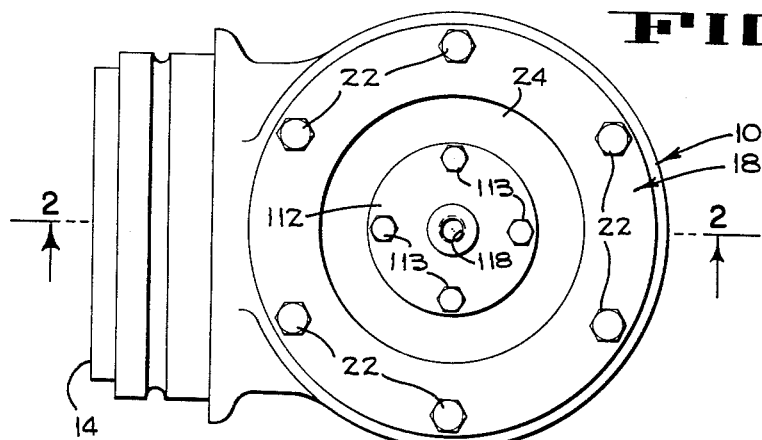
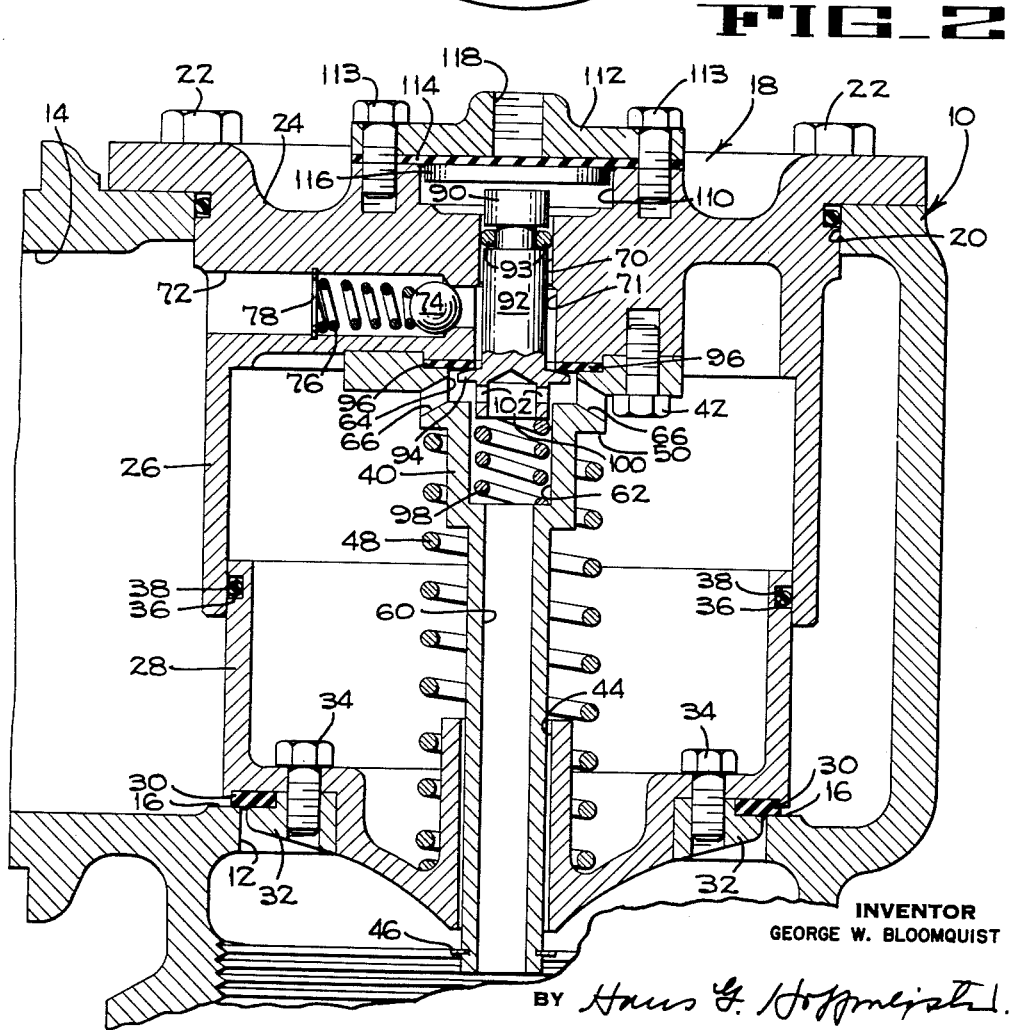
INVENTOR
GEORGE W. BLOOMQUIST
BY 
ATTORNEY Sept. 14, 1965        G. W. BLOOMQUIST        3,206,158
                         SHUT-OFF VALVE
Filed Oct. 23, 1962                      2 Sheets-Sheet 2
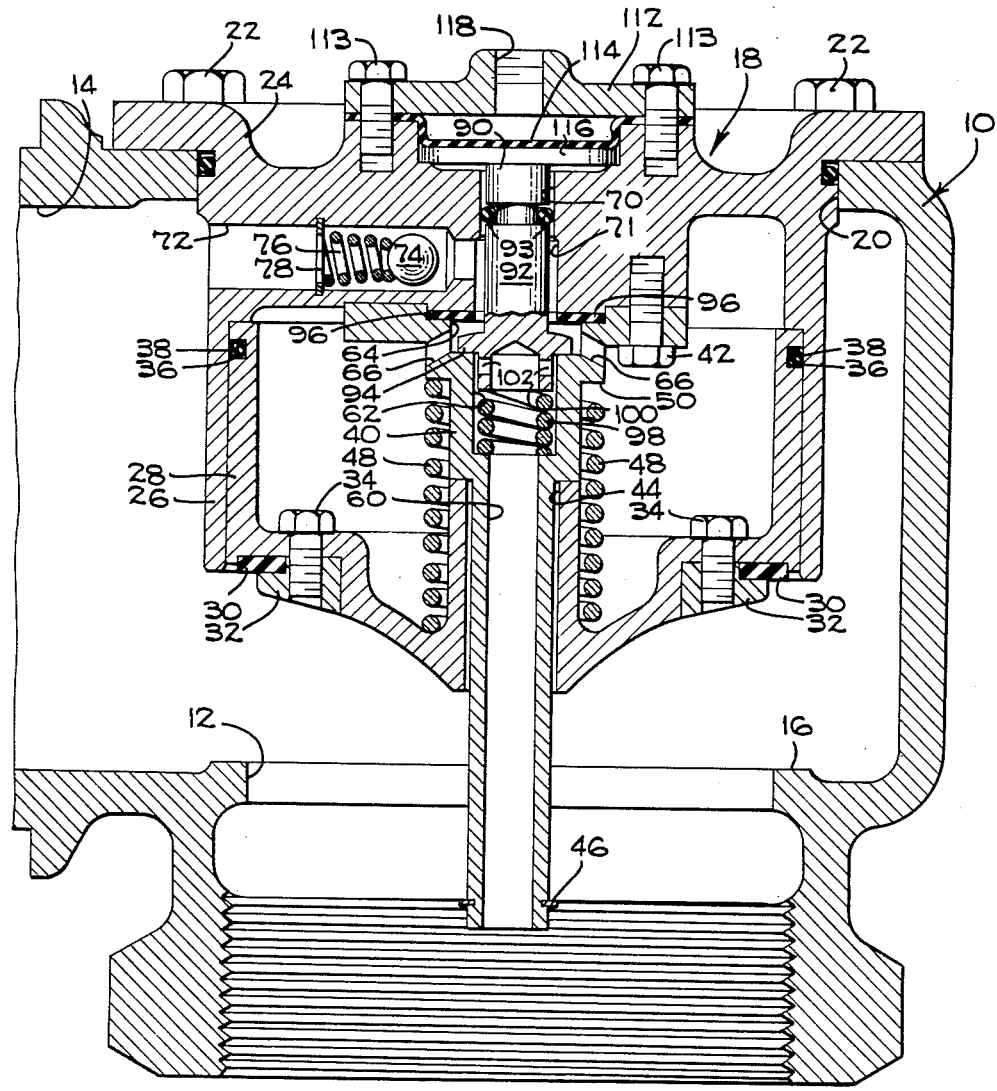
FIG_3
INVENTOR
GEORGE W. BLOOMQUIST
BY *Hans G. Hoffmeister*
ATTORNEY 3,206,158
SHUT-OFF VALVE
George W. Bloomquist, Long Beach, Calif., assignor to FMC Corporation, San Jose, Calif., a corporation of Delaware
Filed Oct. 23, 1962, Ser. No. 232,362
7 Claims. (Cl. 251—25)

This invention pertains to valves and relates more particularly to a shut-off valve which may be remotely controlled and which will close automatically if the upstream pressure falls below a predetermined value.

An object of the present invention is to provide a remotely controlled valve which cannot be opened unless a predetermined fluid pressure exists upstream from the valve.

Another object is to provide a pressure responsive valve which will automatically close if the flow of fluid through the valve stops, or if the fluid pressure therewithin drops below a predetermined value.

Another object is to provide a valve which can be positively closed regardless of the fluid pressure in the upstream portion of the line in which it is installed.

Other objects and advantages of the present invention will be apparent from the following detailed description taken in conjunction with the accompanying drawings, wherein:

FIG. 1 is a plan view of the valve of the present invention.

FIG. 2 is a section taken on line 2—2 of FIG. 1 showing the valve elements in their closed positions.

FIG. 3 is a section similar to FIG. 2 showing the valve elements in open positions.

The valve of the present invention comprises a housing 10 adapted to be connected into a flow conduit and having inlet and outlet openings or ports 12 and 14, respectively, arranged at right angles to each other. An annular valve seat 16 surrounds the inlet port 12 in axial alignment therewith.

A valve assembly 18 is mounted within an opening 20 in the housing 10 in axial alignment with and opposing the valve seat 16. The assembly 18 is retained in the housing 10 by a series of cap screws 22 screwed into the housing.

The valve assembly 18 has a cap portion 24 which seals the opening 20. A cylinder 26 integral with the cap portion 24 projects therefrom toward the valve seat 16. A cylindrical piston valve 28 which is closed at its outer end, is telescopically fitted within the cylinder 26 and carries on its closed end an annular sealing element 30 fixed thereto by a clamp ring 32 and adapted to make sealing engagement with the valve seat 16 to prevent flow through the housing 10. The clamp ring 32 is fastened to the closed end of the piston 28 by cap screws 34.

An O-ring 36 in a groove 38 in the peripheral surface of the piston 28 adjacent the inner end thereof makes sliding, sealing engagement with the inner wall of the cylinder 26.

A tubular element 40 fixed to the inner side of the cap portion 24 by cap screws 42 projects through the cylinder 26, piston 28, and a central aperture 44 provided in the closed end of the piston. A snap ring 46 fitted in a groove on the distal end of the tube 40 retains the piston and cylinder in assembled relation. A compression spring 48 surrounds the tube 40 and bears at its opposite ends against an abutment surface 50 adjacent the inner end of the tube and the inner surface of the closed end of the piston 28 to urge the piston toward the valve seat 16.

The bore 60 through the tube 40 is counterbored at 62 and further counterbored at 64. A plurality of ports 66 connect the counterbore 64 with the interior of the cylinder 26.

The cap portion 24 of the housing is provided with a central bore 70 coaxial with the bore 60 through the tube 40 and with a counterbore 71. A radial passage 72 connects the counterbore 71 with the outlet port 14 of the valve. A ball check valve 74 mounted in the passage 72 permits fluid flow from the counterbore 71 to the outlet port 14 but not in the opposite direction. The ball valve 74 is provided with the usual spring 76 held in operating position by a retaining snap ring 78.

A pilot valve 90 reciprocatably mounted in the cap's bore 70 has a stem portion 92 which extends loosely through the counterbore 71, and an O-ring 93 seals between the stem 92 and the wall of the bore 70. A peripheral flange 94 on the stem 92 is spaced from both ends thereof and its upper surface is adapted to seal against an annular sealing element 96 clamped between the inner surface of the cap portion 24 and the upper end of the tube 40. A spring 98 normally maintains the pilot valve 90 in this closed position.

The lower end of the stem 92 is provided with a blind bore 100, and a plurality of lateral, or radial ports 102 in the stem provide fluid communication between the blind bore 100 and the counterbore 64 in the tube 40 when the pilot valve is in said closed position.

The upper end of the stem 92 of the pilot valve 90 projects into a recess 110 formed in the upper surface of the cap portion 24. A secondary cap 112 attached to the cap 24 by cap screws 113 closes the recess 110 and a flexible, resilient diaphragm 114 is clamped between the cap 112 and the cap portion 24. A metal disc 116 is interposed between the diaphragm 114 and the upper end of the valve stem 92, and may be bonded or otherwise attached to the lower surface of the diaphragm 114. The cap 112 is provided with a threaded port 118 which is threaded to receive a valve control fluid conduit (not shown).

In the operation of the valve, with the pilot valve in the position illustrated in FIG. 2, pressure from the upstream conduit (not shown) connected to the inlet port 12 flows through the bore 60 in the tube 40, the blind bore 100 and ports 102 in the pilot valve stem, and through ports 66 into the interior of the cylinder 26. The pressure is thus equalized on the opposite sides of the closed end of piston 28. The spring 48 is thus enabled to force the piston 28 outward so that the sealing element 30 establishes sealing engagement with the valve seat 16 and thereby prevents flow through the housing 10.

To open the valve, fluid pressure is applied through the port 118 by means of the mentioned valve control fluid conduit (not shown) depressing the diaphragm 114 and thereby moving the pilot valve 90 to the position illustrated in FIG. 3. With the pilot valve 90 in this position, fluid flow through the bore 60 of the tube 40 is blocked. The fluid within the cylinder 26 discharges through the ports 66, counterbore 71, the check valve 74, and passageway 72 to the outlet port 14 of the valve housing 10. The discharge of fluid from the cylinder 26 creates a pressure differential across the closed end of the piston 28, and when this pressure differential becomes greater than the pressure of the spring 48 the piston 28 is forced away from its seat 16, to the position illustrated in FIG. 3, thus opening the valve for flow therethrough.

If for any reason the pressure in the upstream conduit and bearing against the lower face of the piston 28, drops below the value of the force stored in the spring 48, the valve will automatically close. If the pilot valve is released by removing the fluid pressure applied through port 118, the pressures within and without the piston and cylinder arrangement 28, 26 will equalize in the manner described above and again the spring 48 will close the valve.

While a preferred embodiment of the invention has been described herein, changes may be made therein without departing from the spirit of the invention as defined in the appended claims.

The invention having thus been described what is claimed and desired to be protected by Letters Patent is:

1. In a valve including a housing provided with a main valve seat, a main flow passage extending through the seat, and an opening in spaced co-axial relation to the seat; a cap mounted on the housing and longitudinally projecting through said opening; a cylinder projecting from the cap toward said seat; a tubular piston slidably interfitted with the cylinder for movement between a closed position on the seat and an open position spaced from the seat, said cylinder and piston defining a chamber; means for yieldably urging the piston into closed position, said cap having a lateral passage communicating with the main passage, said cap also having a longitudinal passage providing communication between the lateral passage and the chamber; a pilot valve seat encircling said longitudinal passage between said lateral passage and the chamber; a tube mounted on the cap and projecting through the chamber and piston, said tube providing communication between the longitudinal passage and the main passage and having a tube seat confronting said pilot valve seat and a lateral port intermediate the tube and pilot seats and providing communication between the tube and the chamber; a pilot valve member mounted in the longitudinal passage for movement between a first position over the tube seat thereby blocking fluid flow from the tube into the chamber and allowing fluid flow from the chamber into said longitudinal passage and a second position over the pilot seat thereby blocking fluid flow from the chamber into the longitudinal passage and allowing fluid flow from the tube into the chamber; means yieldably urging the pilot valve member into its second position; fluid operative means for moving the pilot valve member into its first position; and means in the lateral passage for yieldably precluding fluid flow from the longitudinal passage through the lateral passage into the main passage.

2. The valve of claim 1 wherein said longitudinal passage is co-axial with said main valve seat, and wherein said tube is co-axial with said longitudinal passage.

3. The valve of claim 1 wherein said fluid operative means includes an elastic diaphragm mounted on said cap and movable, in response to fluid pressure, against said pilot valve member for moving the same into its first position.

4. In a valve including housing means having an inlet, an outlet, and a main valve seat through which fluid flows from the inlet to the outlet; a main valve member yieldably urged against said valve seat, said housing means and valve member defining a chamber on the opposite side of the valve member from the inlet; and a tube having an inlet opening communicating with said inlet, a valve control mechanism wherein said housing means includes a first passage coaxial with said tube and in fluid communication therewith, said first passage and said tube having valve seats in confronting relation to each other; a pilot valve member mounted in said first passage for movement between a first position closing the seat for the tube and a second position closing the seat for the first passage; and means yieldably urging said pilot valve member into its second position, said tube having an outlet opening between said confronting seats, said outlet opening establishing communication between said chamber and the seat in the tube when said pilot valve member is in its second position and establishing communication between said chamber and the seat for the first passage when the pilot valve member is in its first position, and said housing means having a second passage providing communication between said first passage and the outlet of the housing means, said pilot valve member having a peripheral flange engageable with said confronting seats in the respective positions of said pilot valve member; said pilot valve member also having a ported tubular portion projecting from said flange and fitted in the tube for guiding said pilot valve member between its positions and for conducting fluid from the tube through said lateral outlet opening into the chamber when the pilot valve member is in its second position.

5. In a valve including housing means having an inlet, an outlet, and a main valve seat through which fluid flows from the inlet to the outlet; a main valve member yieldably urged against said valve seat, said housing means and valve member defining a chamber on the opposite side of the valve member from the inlet; and a tube having an inlet opening communicating with said inlet, a valve control mechanism wherein said housing means includes a first passage coaxial with said tube and in fluid communication therewith, said first passage and said tube having valve seats in confronting relation to each other; a pilot valve member mounted in said first passage for movement between a first position closing the seat for the tube and a second position closing the seat for the first passage; and means yieldably urging said pilot valve member into its second position, said tube having an outlet opening between said confronting seats, said outlet opening establishing communication between said chamber and the seat in the tube when said pilot valve member is in its second position and establishing communication between said chamber and the seat for the first passage when the pilot valve member is in its first position, and said housing means having a second passage providing communication between said first passage and the outlet of the housing means, said tube having an internal diametrically reduced shoulder between said inlet opening and the seat in the tube, and said urging means for said pilot valve member being a compression spring positioned between said shoulder and said pilot valve member.

6. In a valve including housing means having an inlet, an outlet, and a main valve seat through which fluid flows from the inlet to the outlet; a main valve member yieldably urged against said valve seat, said housing means and valve member defining a chamber on the opposite side of the valve member from the inlet; and a tube having an inlet opening communicating with said inlet, a valve control mechanism wherein said housing means includes a first passage coaxial with said tube and in fluid communication therewith, said first passage and said tube having valve seats in confronting relation to each other; a pilot valve member mounted in said first passage for movement between a first position closing the seat for the tube and a second position closing the seat for the first passage; means yieldably urging said pilot valve member into its second position, said tube having an outlet opening between said confronting seats, said outlet opening establishing communication between said chamber and the seat in the tube when said pilot valve member is in its second position and establishing communication between said chamber and the seat for the first passage when the pilot valve member is in its first position, and said housing means having a second passage providing communication between said first passage and the outlet of the housing means, said pilot valve member having an end portion projecting out of said first passage at the opposite end thereof from the seat for said first passage; and a diaphragm mounted on said housing means in confronting relation to the end portion of the pilot valve member, and said housing means including a port on the opposite side of the diaphragm from said end portion.

7. In a valve including housing means having an inlet, an outlet, and a main valve seat through which fluid flows from the inlet to the outlet; a main valve member yieldably urged against said valve seat, said housing means and valve member defining a chamber on the opposite side of the valve member from the inlet; and a tube having an inlet opening communicating with said inlet, a valve control mechanism wherein said housing means includes a first passage coaxial with said tube and in fluid communication therewith, said first passage and said tube having valve seats in confronting relation to each other; a pilot valve member mounted in said first passage for movement between a first position closing the seat for the tube and a second position closing the seat for the first passage; means yieldably urging said pilot valve member into its second position, said tube having an outlet opening between said confronting seats, said outlet opening establishing communication between said chamber and the seat in the tube when said pilot valve member is in its second position and establishing communication between said chamber and the seat for the first passage when the pilot valve member is in its first position, and said housing means having a second passage providing communication between said first passage and the outlet of the housing means, said tube having a lower end portion projecting through the main valve seat and an upper end portion connected to the housing means, said upper end portion including an external annular shoulder; and a coiled compression spring encircling said tube and having a lower end bearing against the main valve member and an upper end bearing against said external shoulder.

References Cited by the Examiner

UNITED STATES PATENTS

| | | | |
|---|---|---|---|
| 1,767,039 | 6/30 | Anderson | 251—25 XR |
| 2,480,712 | 8/49 | Cargon | 251—43 XR |
| 2,841,359 | 7/58 | Berck | 251—25 |
| 3,144,056 | 8/64 | Mosher | 251—43 XR |

FOREIGN PATENTS 911,789  4/46  France.

M. CARY NELSON, *Primary Examiner.*

MILTON KAUFMAN, MARTIN P. SCHWADRON,
*Examiners.*